United States Patent
Bhatnagar et al.

(10) Patent No.: US 7,288,307 B2
(45) Date of Patent: Oct. 30, 2007

(54) HYBRID LAMINATED FIBER SHEETS

(75) Inventors: Ashok Bhatnagar, Richmond, VA (US); Lori Wagner, Richmond, VA (US); Harold Lindley Murray, Jr., North East, MD (US)

(73) Assignee: Honeywell International Inc., Morristown, NJ (US)

( * ) Notice: Subject to any disclaimer, the term of this patent is extended or adjusted under 35 U.S.C. 154(b) by 87 days.

(21) Appl. No.: 10/755,556

(22) Filed: Jan. 12, 2004

(65) Prior Publication Data

US 2005/0153098 A1   Jul. 14, 2005

(51) Int. Cl.
*B32B 5/26* (2006.01)
(52) U.S. Cl. ............... 428/113; 428/105; 428/107; 428/906
(58) Field of Classification Search ............ 428/105, 428/107, 113, 906
See application file for complete search history.

(56) References Cited

U.S. PATENT DOCUMENTS

| | | | |
|---|---|---|---|
| 4,623,574 A * | 11/1986 | Harpell et al. ............ 428/113 |
| 5,093,158 A | 3/1992 | Li et al. ................... 427/278 |
| 5,173,138 A | 12/1992 | Blauch et al. ............. 156/177 |
| 5,538,781 A | 7/1996 | Rao et al. ................. 428/229 |
| 5,552,208 A | 9/1996 | Lin et al. .................. 428/113 |
| 5,677,029 A * | 10/1997 | Prevorsek et al. ........ 428/113 |
| 5,766,725 A * | 6/1998 | Hogenboom et al. ...... 428/113 |
| 6,119,575 A * | 9/2000 | Dragone et al. ......... 89/36.05 |
| 6,138,275 A | 10/2000 | Sacks ......................... 2/2.5 |
| 6,147,018 A | 11/2000 | Chiou ....................... 442/243 |
| 6,162,746 A | 12/2000 | Chiou ....................... 442/134 |
| 6,475,936 B1 | 11/2002 | Chiou ....................... 442/203 |
| 6,534,426 B1 | 3/2003 | Chiou ....................... 442/203 |
| 6,642,159 B1 * | 11/2003 | Bhatnagar et al. ........ 442/134 |
| 2003/0110733 A1 | 6/2003 | Grace et al. .............. 52/724.1 |

FOREIGN PATENT DOCUMENTS

| WO | WO 01/96111 | * 12/2001 |
|---|---|---|
| WO | WO 01/96111 A1 | 12/2001 |

* cited by examiner

*Primary Examiner*—Stanley S. Silverman
*Assistant Examiner*—Paul Wartalowicz
(74) *Attorney, Agent, or Firm*—Bruce O. Bradford

(57) ABSTRACT

Hybrid laminated unidirectional fiber sheets, and assemblies thereof, having utility for impact absorption, ballistic-resistance, penetration-resistance, spall shields, structural composites and for other applications.

14 Claims, 5 Drawing Sheets

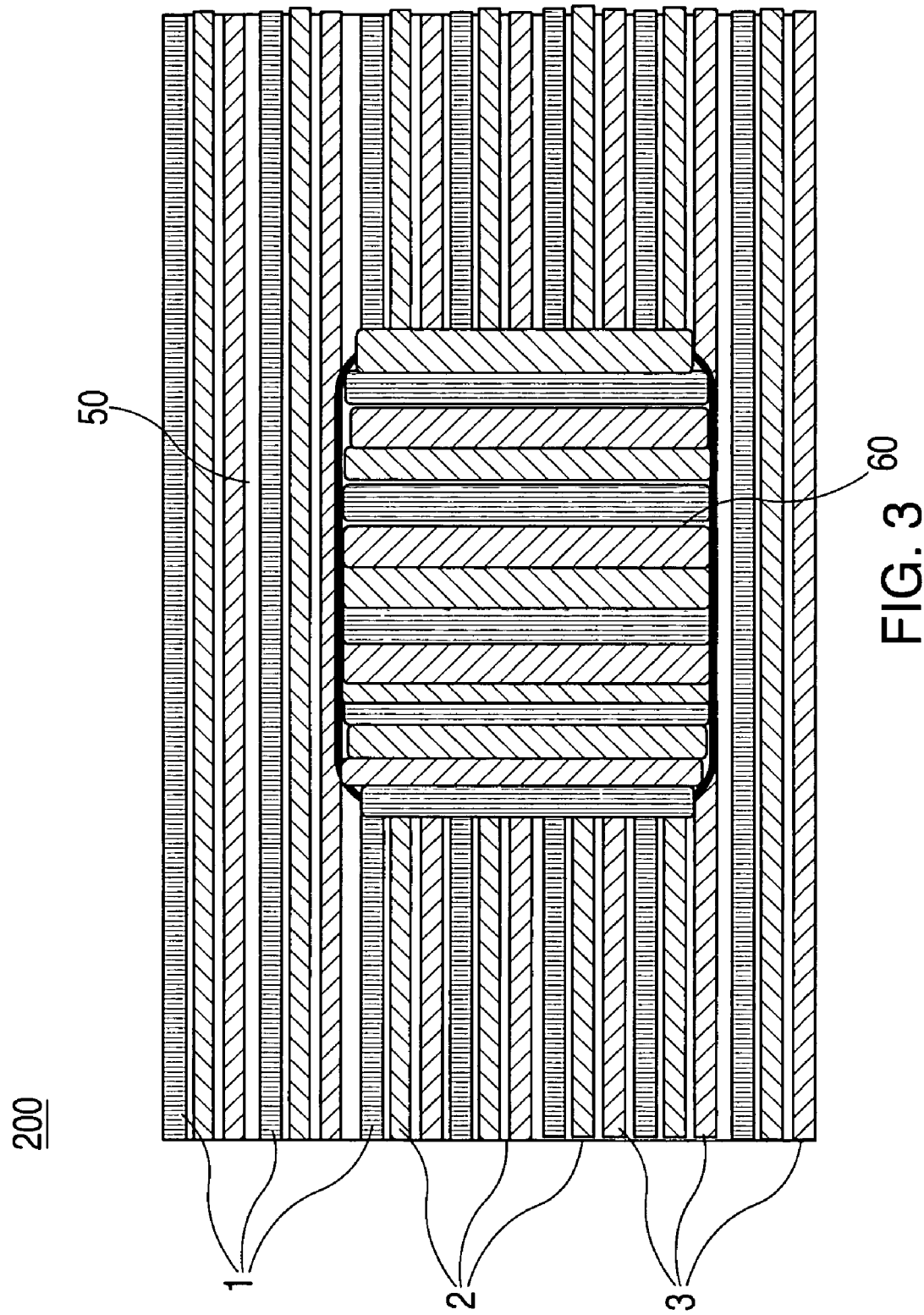

HYBRID LAMINATED FIBER SHEETS

BACKGROUND OF THE INVENTION

1. Field of the Invention

The invention relates to hybrid laminated unidirectional fiber sheets, and assemblies thereof, having utility for impact absorption, ballistic resistance and penetration resistance per se, as well as in spall shields, structural composites and other applications.

2. Description of the Related Art

The construction of body armor for personal protection is an ancient but not archaic art. Metal armor, already well known to the Egyptians by 1500 B.C., persisted in use until about the end of the 17$^{th}$ century. In recent times, body armor has again become practical through the discovery of new strong fibers such as aramids, high molecular weight polyethylene, and polybenzazoles.

Various fiber-reinforced constructions are known for use in impact-resistant, ballistic-resistant and penetration-resistant articles such as helmets, panels, and vests. These articles display varying degrees of resistance to penetration by impact from knives or projectiles such as BB's, bullets, shells, shrapnel, glass fragments and the like. Ballistic-resistant and/or penetration-resistant articles which include high strength fibers made from materials such as high molecular weight polyethylene, aramids and polybenzazoles are known. See, e.g., U.S. Pat. Nos. 6,534,426, 6,475,936, and a 1984 publication of E.I. duPont De Nemours International S.A. entitled "Lightweight Composite Hard Armor Non Apparel Systems with T-963 3300 dtex DuPont Kevlar 29 Fibre." Such articles are said to be either flexible or rigid depending on the nature of their construction and the materials employed.

Body armor is typically formed from layers of woven fabrics or non-woven sheets of fibers that are plied together. The fibers in a non-woven sheet may be unidirectionally oriented or felted in random orientation. Unidirectional fiber sheets generally contain a matrix resin to stabilize the structure. Successive sheets are rotated relative to one another, for example at angles of 0°/90° or 0°/45°/90°/45°/0° or at other angles. To construct rigid composites of this type, individual sheets are bonded together using heat and pressure to adhere the matrix in each sheet, forming a bond between them, and consolidating the whole into a unitary article.

U.S. Pat. No. 4,623,574, discloses composites comprising a network of fibers embedded in an elastomeric matrix.

U.S. Pat. No. 5,677,029 discloses a flexible, penetration-resistant composite comprising at least one fibrous layer comprised of a network of strong fibers, and at least one continuous polymeric layer coextensive with, and at least partially bound to a surface of one of the fibrous layers.

U.S. Pat. No. 5,552,208 discloses a ballistic resistant article comprised of a high strength fiber network in a matrix and a second matrix material in the form of a film which is adjacent to at least one side of the matrix-impregnated fiber network.

U.S. Pat. No. 6,119,575 discloses a body armor containing at least one ply of aromatic fibers in a first matrix, at least one ply of a woven fabric and at least one ply of polyolefin fibers in a second matrix.

U.S. Pat. No. 6,147,018 discloses hybrid protective composites made from at least one layer of woven polybenzoxazole (PBO) or polybenzothiazole (PBT) fibers and at least one layer of a fiber network of another polymer.

U.S. Pat. No. 6,162,746 discloses hybrid protective composites made from a plurality of layers of woven PBO or PBT fibers, a plurality of ballistic layers which may be non-woven unidirectional fibers, and a plurality of tightly woven layers.

U.S. Pat. No. 6,138,275 discloses a body armor comprising a flexible penetration-resistant layer backed up by a flexible impact-absorbing layer of plastic material.

U.S. Patent Publication 2003/0037361 A1 discloses a ballistic vest containing a stack of flexible woven fabrics and a stack of flexible unidirectional layers.

International Application WO 01/96111 A1 discloses a composite material comprising fabrics selected from para-aramides, high performance polyethylene and PBO, and a thermoplastic polymeric material applied to both major faces of the fabric material.

In a different area, U.S. Patent Publication 2003/0110733 A1 discloses a hybrid fabric for structural reinforcement having a first fiber with a first ultimate strain and a second fiber with a second ultimate strain greater than the first ultimate strain.

Each of the constructions cited above represented progress toward the goals to which they were directed. However, none described the specific constructions of the laminates and assemblies of this invention, and none satisfied all of the needs met by this invention.

The earlier constructions had several disadvantages. Cross-plied unidirectional fiber composites generally have better ballistic resistance and are lower weight than woven fabrics made from the same fiber type; however, they are typically more costly to produce and thus, more expensive. One continuing need is a means of reducing the cost of protective materials.

A related need recognizes that high strength fibers are intrinsically expensive and are also used in other applications such as ropes, commercial fishing nets, tire cord and a variety of reinforced plastic products, both military and civilian. In times when military demands are high, production capacity may not meet all needs. Because strong fibers are produced by complex processes, capacity cannot be quickly increased. A need exists to more efficiently utilize the limited supply of high strength fibers.

Additionally, each of the different high strength fibers used in protective materials such as armor has different characteristics against higher speed and lower speed projectiles. Protective materials having a more uniform response to different threats would increase reliability and safety.

SUMMARY OF THE INVENTION

The invention is hybrid laminated unidirectional fiber sheets, and assemblies thereof, having utility for impact absorption, ballistic resistance and penetration resistance per se, as well as in spall shields, structural composites and other applications. In one embodiment, the laminates of the invention comprise N pairs of laminae comprised of unidirectional fibers in a matrix, where N is an integer equal to or greater than 2; the fiber composition of a first lamina of a given said pair being the same as the fiber composition of the second lamina of said given pair; the fiber direction in said first lamina of said given pair being normal to the fiber direction in the second lamina of said given pair; the direction of the fibers in a lamina being at an angle relative to the direction of the fibers in adjacent laminae; the number of pairs of laminae having fiber compositions different from one another being from 2 to N; and the fiber laminae comprising the laminate being bonded together in stacked array.

In another embodiment the invention is a laminate comprising two or more laminae of unidirectional fibers in a matrix; each said lamina being comprised of two or more fibers of different composition in essentially periodic array in a direction transverse to the fiber direction; the direction of the fibers in one lamina being at an angle relative to the direction of the fibers in adjacent laminae; and the laminae comprising the laminate being bonded together in stacked array.

Assemblies of the invention include, among others, rigid panels comprising a plurality of the inventive laminates bonded together in stacked array, and flexible articles comprising a plurality of unconnected or loosely connected inventive laminates.

BRIEF DESCRIPTION OF THE DRAWINGS

In the accompanying drawing figures:

FIG. 3 is a cutaway drawing illustrating a two-ply embodiment of the invention having two laminae of unidirectional fibers in a matrix, each lamina having three fibers of different compositions in essentially periodic array.

DETAILED DESCRIPTION OF THE INVENTION

The invention is hybrid laminated fiber sheets and assemblies thereof. The laminates of the invention are comprised of unidirectional laminae and at least two different fiber compositions. By unidirectional lamina is meant unidirectional fibers in a matrix. By unidirectional fibers is meant substantially all fibers in the lamina being parallel to one another; this is not meant, however, to preclude the use of an insubstantial number of parallel and/or non-parallel fibers for the purpose of stabilizing the other fibers, as is known in the art.

For purposes of the present invention, a fiber is an elongate body, the length dimension of which is much greater than the transverse dimensions of width and thickness. Accordingly, the term fiber as used herein includes one, or a plurality of filaments, ribbons, strips, films and the like having regular or irregular cross-sections.

In one embodiment, a laminate of the invention comprises N pairs of laminae comprised of unidirectional fibers in a matrix, where N is an integer equal to or greater than 2; the fiber composition of a first lamina of a given pair being the same as the fiber composition of the second lamina of the given pair; the fiber direction in the first lamina of the given pair being normal to the fiber direction in the second lamina of the given pair; the direction of the fibers in a lamina being at an angle relative to the direction of the fibers in adjacent laminae; the number of pairs of laminae having fiber compositions different from one another being from 2 to N, and the laminae comprising the laminate being bonded together in stacked array. Preferably, N is from 2 to 10, more preferably, from 2 to 4. The laminae of a given pair are not necessarily adjacent to one another.

A preferred form of this embodiment is comprised of first and second pairs of laminae of unidirectional fibers in a matrix, consisting in sequence of a first, second, third, and fourth lamina. The first pair of laminae consists of the first and fourth laminae, the fiber directions of which are normal to each other. The second pair of laminae consists of the second and third laminae, the fiber directions of which are normal to each other; The first pair of laminae are comprised of a first fiber composition, and the second pair of laminae are comprised of a second fiber composition different from the first. The fiber direction in the first lamina is normal to the fiber direction in the second lamina, and the fiber direction in the third lamina is normal to the fiber direction in the fourth lamina. The laminae comprising the laminate are bonded together in stacked array.

Figure 2:
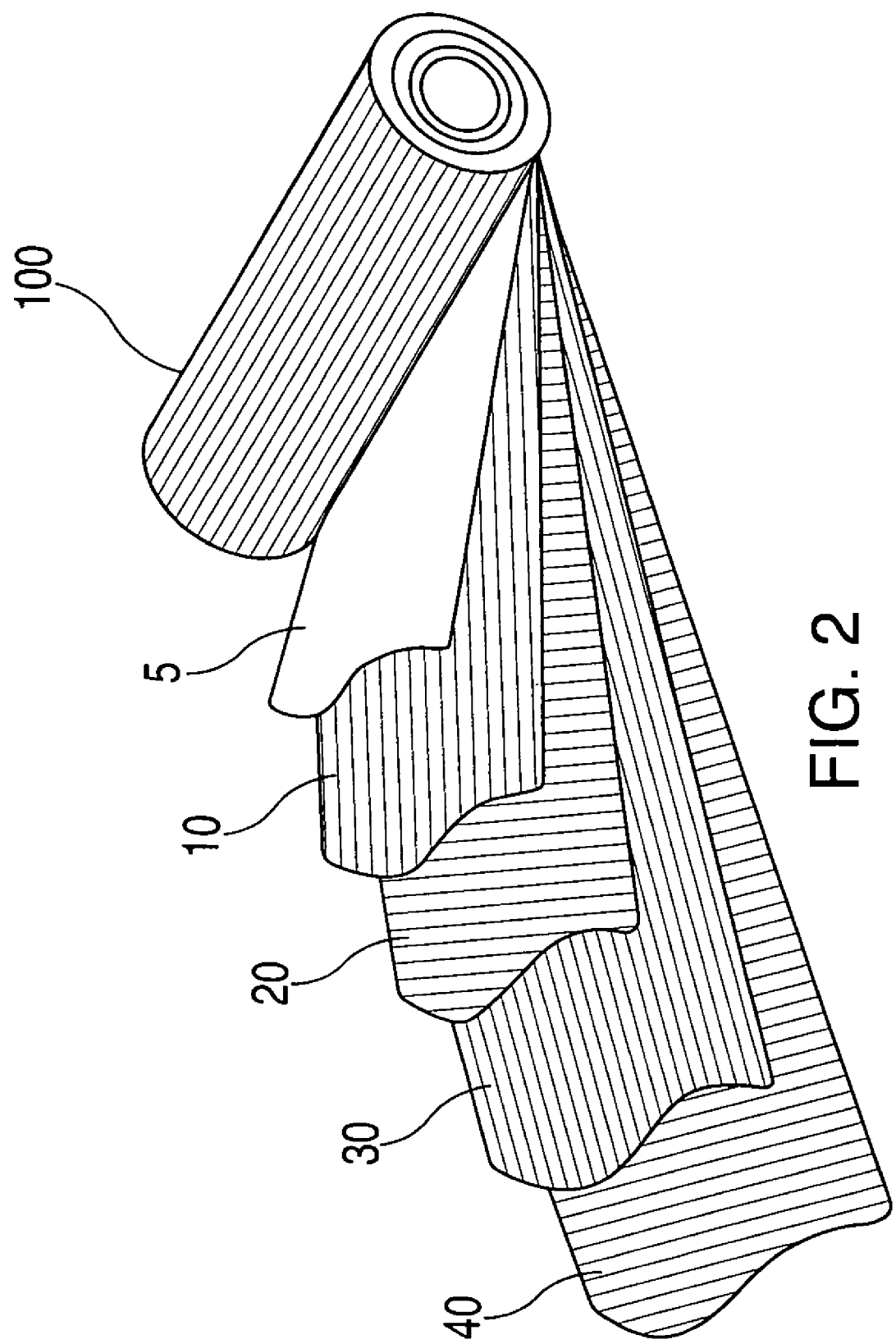
FIG. 2 is an illustration of a laminate of the invention in roll form, showing in peeled-apart view its four constituent laminae of unidirectional fibers in a matrix, the first and fourth laminae being comprised of a first fiber, and the second and third laminae being comprised of a second, different fiber and having a plastic sheet on one surface.

This embodiment, additionally having a plastic sheet on one surface of the laminate, is illustrated in peeled-apart view in FIG. 2. In FIG. 2, a laminate of the invention in roll form 100 comprises four unidirectional fiber laminae (a first lamina 10, a second lamina 20, a third lamina 30 and a fourth lamina 40), a matrix (not shown) stabilizing the laminae and a plastic sheet 5 on the surface of first lamina 10. The fiber directions in adjacent laminae (10/20, 20/30, and 30/40) are normal to each other. The first 10 and the fourth 40 laminae consist of a first fiber composition, while the second 20 and the third 30 laminae consist of a second fiber composition, different from the first.

The fiber composition of a lamina may consist of more than one chemically distinguishable fiber. A lamina and its mate, in a given pair, may be comprised of blends of two or more fibers, or composite fibers, or one fiber over-wrapped with another, or it may comprise two or more fibers of different chemical composition in essentially periodic array in a direction transverse to the fiber direction.

The percent by weight of each chemically distinguishable fiber in a laminate of the invention may vary from about 1 percent to 99 percent. Preferably, the content of each chemically distinguishable fiber is from about 10 percent to 90 percent, more preferably from about 25 percent to 75 percent, by weight of the laminate. Most preferably, the laminate is comprised of essentially equal weights of all fibers.

In another embodiment, the invention is a laminate comprising two or more laminae of unidirectional fibers in a matrix, with each of the lamina in turn comprising two or more fibers of different composition in essentially periodic array in a direction transverse to the fiber direction. The direction of the fibers in one lamina are at an angle relative to the direction of the fibers in adjacent laminae, and the laminae comprising the laminate are bonded together in stacked array.

Preferably, the laminate of this embodiment is comprised of at least one pair of laminae wherein the fiber direction in a first lamina of the pair is normal to the fiber direction in the second lamina of the pair. Preferably, the composition and construction of the first lamina of this pair is the same as the composition and construction of the second lamina of this pair.

This embodiment of the invention is illustrated in FIG. 3. In FIG. 3, the laminate of the invention 200 consists of two unidirectional fiber laminae 50 and 60. Each lamina, 50 and 60, consists of fibers of three different compositions 1, 2, and 3 in essentially periodic array in a direction transverse to the fiber direction. The fiber direction in lamina 50 is normal to that of lamina 60, while the fiber composition and construction are the same in each.

Preferably, a laminate of the invention has a balanced construction. A balanced laminate construction is one in which all laminae are found only in ±θ° pairs relative to the centerline of the laminate, or at 0/90°. The members of these pairs are not necessarily adjacent to one another. Preferably a laminate of the invention also has a symmetrical construction about a mid-plane. Preferably the laminates of the invention are in the form of continuous rolls of indefinite length.

It is also preferred that at least one pair of laminae in a laminate of the invention comprises a plurality of fibers having a tenacity greater than 15, more preferably greater than 30, and most preferably greater than 40, grams/denier as measured by ASTM 2256 at 10 inch (25.4 cm) gauge length and strain rate of 100%/min.

Preferably the fiber compositions in the laminates of the invention are selected from the group consisting of high molecular weight polyethylene (HMWPE), polyaramid, co-polyaramid, PBO, PBT, polyamide, polyester and ceramic fibers. More preferably, the fiber compositions are selected from the group consisting of HMWPE, poly(p-phenylene terephthalamide), copolymers of p-phenylene terephthalamide, poly(p-phenylene-2-6-benzobisoxazole), poly(p-phenylene-2-6-benzobisthiazole), polyethylene terephthalate, nylon 6, nylon 6,6, nylon 4,6, and ceramic. Yet more preferably, at least one of the multiple fiber compositions is selected from the group consisting of HMWPE, poly(p-phenylene terephthalamide), copolymers of p-phenylene terephthalamide, poly(p-phenylene-2-6-benzobisoxazole), and poly(p-phenylene-2-6-benzobisthiazole). Most preferably, when the number of fiber compositions is two, the two fiber compositions are selected from the group of paired compositions consisting of HMWPE and poly(p-phenylene terephthalamide)/copolymers of p-phenylene terephthalamide, HMWPE and poly(p-phenylene-2-6-benzobisthiazole), and poly(p-phenylene terephthalamide) and poly(p-phenylene-2-6-benzobisthiazole).

As used herein, the term polyethylene means a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like.

HMWPE for the purposes of this invention has an intrinsic viscosity in decalin at 135° C. from about 5 deciliter/gram (dl/g) to about 35 dl/g. Such HMWPE fibers may be grown in solution as described in U.S. Pat. No. 4,137,394 to Meihuzen et al., or U.S. Pat. No. 4,356,138 of Kavesh et al., issued Oct. 26, 1982, or a filament spun from a solution to form a gel structure, as described in German Off. No. 3,004,699 and GB No. 2051667, and especially as described in U.S. Pat. No. 4,413,110 and sold under the name SPECTRA® by Honeywell International Inc. The disclosure of U.S. Pat. No. 4,413,110 is hereby incorporated by reference to the extent that it is not inconsistent herewith. The polyethylene fibers may also be produced by a rolling and drawing process as described in U.S. Pat. No. 5,702,657 and sold under the name TENSYLON® by ITS Industries Inc.

In the case of aramid fibers, suitable fibers formed from aromatic polyamides are described in U.S. Pat. Nos. 3,671,542 and 5,010,168 which are hereby incorporated by reference. Aramid fibers are produced commercially by E.I. Dupont Co. under the trade names of KEVLAR® and NOMEX®; by Teijin Twaron BV under the trade names TWARON®; TECHNORA® and TEIJINCONEX®; by JSC Chim Volokno under the name ARMOS; and by Kamensk Volokno JSC under the names RUSAR and SVM. Poly(p-phenylene terephalamide) and p-phenylene terephalamide aramid co-polymer fibers having moderately high moduli and tenacity values are particularly useful in the present invention. An example of a p-phenylene terephalamide copolymer aramid useful in the invention is co-poly-(paraphenylene3,4'-oxydiphenylene terephalamide). Also useful in the practice of this invention are poly(m-phenylene isophthalamide) fibers.

Suitable liquid crystal copolyester fibers for the practice of this invention are disclosed, for example, in U.S. Pat. Nos. 3,975,487; 4,118,372 and 4,161,470.

Suitable PBO fibers for the practice of this invention are disclosed for example in U.S. Pat. Nos. 5,286,833, 5,296,185, 5,356,584, 5,534,205 and 6,040,050 hereby incorporated by reference. Preferably, the PBO fibers are ZYLON® poly(p-phenylene-2,6-benzobisoxazole) fibers from Toyobo Co.

The matrix material in a laminate of the invention is selected according to the end use requirements. If a flexible laminate is needed, the matrix material is preferably an elastomer with an initial tensile modulus less than 6,000 psi (41.4 MPa) measured by ASTM D638. If a rigid laminate is needed, rigidity may be obtained either with sufficient numbers of laminae having a low modulus matrix material, or with fewer laminae having a high modulus resin matrix. When the laminate is used in a structural composite, it is preferred that the matrix material have an initial tensile modulus greater than $1 \times 10^6$ psi (6.9 GPa) measured by ASTM D638.

A wide variety of elastomeric materials and formulations having appropriately low modulus may be utilized in this invention. For example, any of the following materials may be employed: polybutadiene, polyisoprene, natural rubber, ethylene-propylene copolymers, ethylene-propylene-diene terpolymers, polysulfide polymers, polyurethane elastomers, cholorosulfinated polyethylene, polychloroprene, plasticized polyvinylchloride using dioctyl phthalate or other plasticizers well known in the art, butadiene acrylonitrile elastomers, poly(isobutylene-co-isoprene), polyacrylates, polyesters, polyethers, fluoroelastomers, silicone elastomers, thermoplastic elastomers, copolymers of ethylene.

Preferred are block copolymers of conjugated dienes and vinyl aromatic copolymers. Many of these polymers are produced commercially by Kraton Polymers, Inc. and others.

The low modulus elastomer may be compounded with fillers such as carbon black, silica, etc. and may be extended with oils and vulcanized by sulfur, peroxide, metal oxide or radiation cure systems using methods well known to rubber technologists. Blends of different elastomeric materials may be used together or one or more elastomers may be blended with one or more thermoplastics.

High modulus matrix resins useful in a laminate of the invention include thermoset allyls, aminos, cyanates, epoxies, phenolics, unsaturated polyesters, bismaleimides, rigid polyurethanes, silicones, vinyl esters and their copolymers and blends. It is important only that the matrix resin possesses the necessary initial tensile modulus. Thermoset vinyl ester resins are preferred.

Preferably, the vinyl ester is one produced by the esterification of a polyfunctional epoxy resin with an unsaturated monocarboxylic acid, usually methacrylic or acrylic acid. Illustrative vinyl esters include diglycidyl adipate, diglycidyl isophthalate, di-(2,3-epoxybutyl)adipate, di-(2,3-epoxybutyl)oxalate, di-(2,3-epoxyhexyl)succinate, di-(3,4-epoxybutyl)maleate, di-(2,3-epoxyoctyl)pimelate, di-(2,3-epoxybutyl)phthalate, di-(2,3-epoxyoctyl) tetrahydrophthalate, di-(4,5-epoxydodecyl)maleate, di-(23-epoxybutyl)terephthalate, di-(2,3-epoxypentyl) thiodiproprionate, di-(5,6-epoxytetradecyl) diphenyldicarboxylate, di-(3,4-epoxyheptyl) sulphonyldibutyrate, tri-(2,3-epoxybutyl)-1,2,4-butanetricarboxylate, di-(5,6-epoxypentadecyl)maleate, di-(2,3-epoxybutyl)azelate, di-(3,4-epoxypentadecyl)citrate, di-(4,5-epoxyoctyl)cyclohexane-1,3-dicarboxylate, di-(4,5-epoxyoctadecyl malonate, bisphenol-A-fumaric acid polyester and similar materials. Most preferred are epoxy based vinyl ester resins, such as the DERAKANE® resins manufactured by Dow Chemical Company.

As used herein, the term "matrix" does not imply any particular degree of filling of void volume in the laminate. The matrix resin preferably comprises from 1 to 25 percent by weight of the laminate. More preferably, the matrix resin comprises from 5 to 15 percent by weight of the laminate. As the impact properties of the laminate are determined almost entirely by the fiber content, and it is desirable to minimize the weight of the laminate, the matrix content is preferably kept as low as possible consistent with the requirements of particular manufacturing processes. The level of matrix necessary to stabilize the unidirectional laminae and to maintain a robust manufacturing operation will be known to the man skilled in the art.

The laminates of the invention may additionally be comprised of a plastic sheet as at least one surface or interleaf of the laminate. The plastic sheet may comprise from 1 to 40 percent by weight of the laminate. The plastic sheet is preferably selected from the group consisting of polyolefin, polyamide, polyester, polycarbonate, ionomer and polyfluorocarbon. The plastic sheet may be a thin film of from about 0.006 to about 0.25 mm in thickness, preferably polyethylene, applied to both surfaces of the laminate as a tack-free layer to keep laminates from adhering to one another in flexible assemblies. Alternatively, the plastic sheet may be from about 0.25 mm to several millimeters in thickness, preferably made of polycarbonate or ionomer, and applied to one surface of the laminate. This laminate might serve as one face of a penetration (stab) resistant assembly or as the body-side face of a ballistic-resistant assembly. In the latter construction, the plastic sheet would act as a "trauma pad" to reduce blunt trauma.

The matrix resin may be applied to the fibers in a variety of ways and any method known to those skilled in the art may be used. Preferably, a unidirectional fiber lamina in a matrix is formed in a continuous process illustrated schematically in FIG. 1. Fibers are supplied from a creel 102 and passed through a combing station 104 to form a unidirectional network. Different fiber types may be arranged on the creel so as to produce a fiber network with a periodic arrangement of the fibers in a transverse direction. The fiber network is then placed on a carrier web that can be a paper or a plastic film or plastic sheet substrate 106. The matrix composition is applied to the fiber network at 108. The matrix composition may contain a solvent diluent for ease of application. The coated fiber network is then passed through a pair of rollers 110 that spread the matrix composition among the fibers. The rollers may be designed to create a non-uniformly distributed matrix as described in U.S. Pat. No. 5,093,158, hereby incorporated herein by reference to the extent not incompatible herewith. The coated fiber network is then passed through a heated oven 112 to evaporate any solvent in the matrix composition. A nip roller 116 is used to pull the carrier web and prepreg through the system. The substrate and the prepreg that will become a lamina can then be wound on a roller 118 in preparation for construction of a laminate of the invention. The carrier web may be stripped from the prepreg or it may become the plastic sheet part of the final laminate.

Laminates of the invention are preferably produced from continuous rolls of unidirectional prepregs as described above by a continuous cross-plying operation employing the method of U.S. Pat. Nos. 5,173,138 or 5,766,725, hereby incorporated by reference to the extent not incompatible herewith, or by hand lay-up, or by any suitable means. With reference to the apparatus and drawings of U.S. Pat. No. 5,173,138, one prepreg roll is placed on the let off roll 11 of the cross-plying machine and a second prepreg roll is placed on the let off roll 17. The fiber compositions of the prepreg rolls may be the same or different. The prepregs (laminae) are consolidated by the application of heat and pressure in the cross-plying apparatus. Temperatures from about 90° to about 160° C. and pressures of from about 100 psi to about 2500 psi (69-17,000 kPa) are employed depending upon the types of fibers, matrix and plastic sheet present.

To construct laminates of the invention with more than one pair of laminae, the cross-plied product may itself be cross-plied, and cross-plied again a plurality of times to produce a desired laminate construction. In each cross-plying operation, the number of laminae may be doubled. Alternatively, the second and subsequent cross-plying operations may be done with different numbers of lamina in the prepregs to be cross-plied.

When the number of laminae becomes too great for continuous roll formation, the cross-plying may be conducted by hand or by any suitable means.

Assemblies of the laminates of the invention may comprise rigid panels or may be flexible articles with the laminates unconnected or loosely connected. Both rigid panel and flexible assemblies of the invention are useful as ballistic-resistant and/or penetration-resistant articles. A ballistic-resistant/penetration resistant assembly of the is invention is comprised of a plurality of laminates of the invention as described above in stacked array. A ballistic-resistant rigid or flexible article of the invention meets at least the requirements of NIJ Standard 0101.04 Revision A, for Type IIA body armor. A penetration-resistant rigid or flexible article of the invention meets at least the requirements of NIJ Standard 0115.00 for Type 1 stab protection.

Rigid panel assemblies are formed from the inventive laminates by stacking and consolidating in a press under heat and pressure. Molding temperatures of from about 90° to about 160° C. and molding pressures of from about 100 psi to about 2500 psi (69-17,000 kPa) are usually employed depending upon the types of fibers, matrix and plastic sheet present.

Flexible assemblies are formed by loosely stacking laminates with low modulus matrix or laminates with low matrix content. By loosely stacking is meant that the laminates in the assembly are unattached, or are attached only at one or more edges.

It might be anticipated that the hybrid laminates of the invention would show ballistic performance comparable to the least ballistic-resistant fiber in the laminate. Unexpectedly, it has been found that the ballistic properties of a laminate of the invention possesses a V50 and specific energy absorption (SEAT) at least as great as the weight average SEAT of the several fiber components and has in some cases, exceeded the weight average SEAT.

The following examples are presented to provide a more complete understanding of the invention. The specific techniques, conditions, materials, proportions and reported data set forth to illustrate the principles of the invention are exemplary and should not be construed as limiting the scope of the invention.

EXAMPLES

Comparative Example 1

Figure 1:
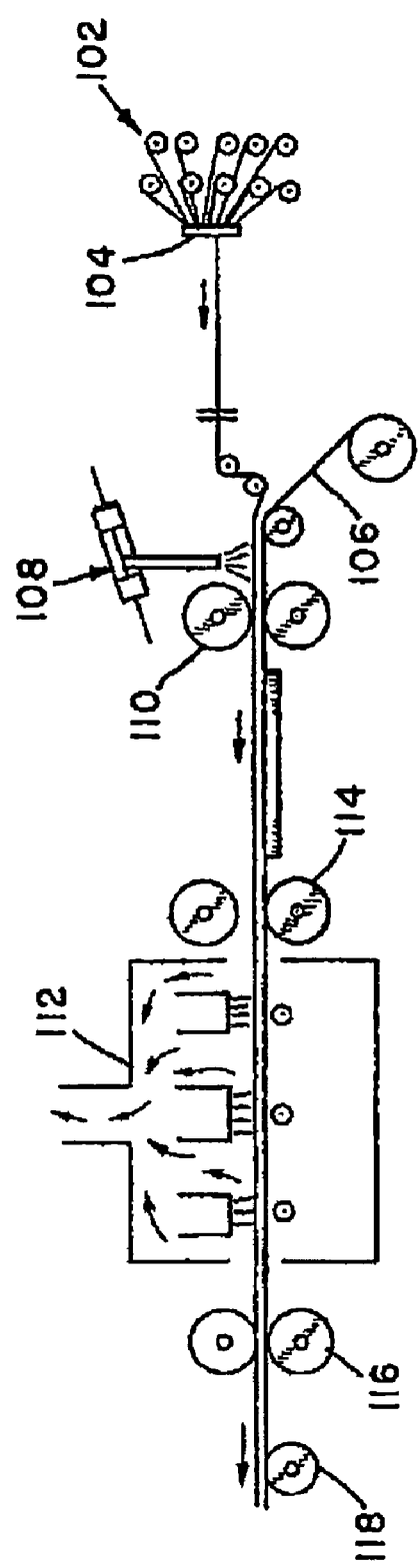
FIG. 1 is a schematic representation of a process for making a lamina.

Two continuous rolls of unidirectional fiber prepregs were prepared from p-phenylene terephthalamide aramid fibers using the apparatus and method illustrated in FIG. 1 and described above. The aramid fibers were reported by the manufacturer to possess a tenacity of 24 grams/denier. The aramid prepregs contained 16 wt. % of a matrix consisting of KRATON® D1107 isoprene-styrene-isoprene block copolymer elastomer. One prepreg was formed with a 0.35 mil (0.0089mm) polyethylene film on one surface. The rolls were placed on the cross-plying machine described in U.S. Pat. No. 5,173,138. The prepregs were cross-plied 0°/90°, aramid to aramid, and consolidated under heat and pressure to create a laminate with two identical aramid fiber laminae and a polyethylene film on one surface. Two continuous rolls of the laminate were wound up.

The rolls thus formed were placed back on the feed positions of the cross-plying machine and cross-plied once again, 0°/90°, aramid to aramid, and consolidated under heat and pressure to create a laminate with four identical aramid fiber laminae and a polyethylene film on both surfaces.

Seventeen pieces measuring 45.72 cm×45.72 cm were cut from these laminates, and plied up in stacked array without connection between the plies. The article so formed was subjected to ballistic testing according to NIJ Standard 0101.04 Revision A. Results of the ballistic testing are shown in Table I and FIGS. 4 and 5.

Comparative Example 2

Two continuous rolls of identical unidirectional fiber prepregs were prepared from ZYLON® AS poly(p-phenylene-2-6-benzobisthiazole) PBO fibers using the apparatus and method illustrated in FIG. 1 and described above. The PBO fibers were reported by the manufacturer, Toyobo Co., Ltd., to possess a tenacity of 37 grams/denier. The PBO prepreg contained 16 wt. % of a matrix consisting of KRATON® D1107 isoprene-styrene-isoprene block copolymer elastomer. Applied to one surface of the prepreg was a 0.35 mil (0.0089 mm) thick polyethylene film.

The rolls were placed on the cross-plying machine described in U.S. Pat. No. 5,173,138. The prepregs were cross-plied 0°/90° and consolidated under heat and pressure with the polyethylene films on the outside to create a laminate with two identical PBO fiber laminae and a polyethylene film on both surfaces. A continuous roll of the laminate was wound up.

Thirty-nine pieces measuring 45.72 cm×45.72 cm were cut from these laminates and plied up in stacked array without connection between the plies. The article so formed was subjected to ballistic testing according to NIJ Standard 0101.04 Revision A. Results of the ballistic testing are shown in Table I and FIGS. 4 and 5.

Example 1

A continuous roll of a unidirectional fiber prepreg was prepared from p-phenylene terephthalamide aramid fibers as described in Comparative Example 1. The aramid prepreg contained 16 wt. % of a matrix consisting of KRATON® D1107 isoprene-styrene-isoprene block copolymer elastomer. Applied to one surface of the prepreg was a 0.35 mil (0.0089 mm) thick polyethylene film.

A continuous roll of unidirectional fiber prepreg was prepared from poly(p-phenylene-2-6-benzobisthiazole) PBO fibers as described in Comparative Example 2. The PBO prepreg contained 16 wt. % of a matrix consisting of KRATON® D 1107 isoprene-styrene-isoprene block copolymer elastomer. The prepreg was formed on strippable release paper.

The aramid and PBO prepreg rolls were placed on the cross-plying machine described in U.S. Pat. No. 5,173,138. The prepregs were cross-plied 0°/90° and consolidated under heat and pressure with the polyethylene film and the release paper on the outside surfaces to create a hybrid laminate with an aramid lamina and a PBO lamina in essentially equal weight fractions. Two identical continuous rolls of the hybrid laminate were wound up.

The two hybrid rolls thus formed were placed back in the feed positions of the cross-plying machine. Provision was made to strip the release paper from the PBO laminae as the prepregs were fed. The prepregs were cross-plied 0°/90°, PBO surface to PBO surface, and consolidated under heat and pressure with the polyethylene films on the outside.

A hybrid laminate of the invention was thereby formed consisting of an outer pair of laminae of aramid, an inner pair of laminae of PBO, the laminae being in a matrix, the fiber direction of each lamina being normal to the fiber direction in adjacent laminae and polyethylene films on both surfaces of the laminate. The weight fractions of aramid and PBO were essentially equal. A continuous roll was wound up.

Sixteen pieces measuring 45.72 cm×45.72 cm were cut from these laminates and plied up in stacked array, without connection between the plies, to form an article of the invention. The article so formed was subjected to ballistic testing according to NIJ Standard 0101.04 Revision A. Results of the ballistic testing are shown in Table I and FIGS. 4 and 5.

Example 2

Rolls of p-phenylene terephthalamide copolymer aramid fibers, and rolls of PBO fiber were placed on a creel 102 of the apparatus illustrated schematically in FIG. 1 and described above. The aramid fibers were reported by the manufacturer, to possess a tenacity of 24 grams/denier. The PBO fibers were reported by the manufacturer to possess a tenacity of 37 grams/denier. The rolls were arranged so that the aramid and PBO fibers alternated side-by-side as they were led into the combing station 104. A unidirectional prepreg was formed with fibers of aramid and PBO alternating in a direction transverse to the fiber direction. The periodic distance between fibers of the same composition was 4.6 mm. The hybrid prepreg contained 16 wt. % of a matrix consisting of KRATON® D1107 isoprene-styreneisoprene block copolymer elastomer. Applied to one surface of the prepreg was a 0.35 mil (0.0089 mm) thick polyethylene film. Two continuous rolls of identical unidirectional hybrid aramid/PBO prepregs containing essentially equal weight fractions of each fiber and a polyethylene film on one surface were wound up.

The rolls were placed on the cross-plying machine described in U.S. Pat. No. 5,173,138. The prepregs were cross-plied 0°/90° and consolidated under heat and pressure to create a laminate of the invention. The laminates consisted of unidirectional laminae of aramid and PBO fibers in a matrix, aramid and PBO alternating in essentially periodic array transverse to the fiber directions, the fiber directions in a lamina being normal to the fiber direction in an adjacent lamina, and a polyethylene film on both surfaces. A continuous roll was wound up.

Sixteen pieces measuring 45.72 cm×45.72 cm were cut from this laminate, and plied up in stacked array without connection between the plies. The article of the invention so formed was subjected to ballistic testing according to NIJ Standard 0101.04 Revision A. Results of the ballistic testing are shown in Table I and FIGS. 4 and 5.

Ballistic Testing

Figure 4A:
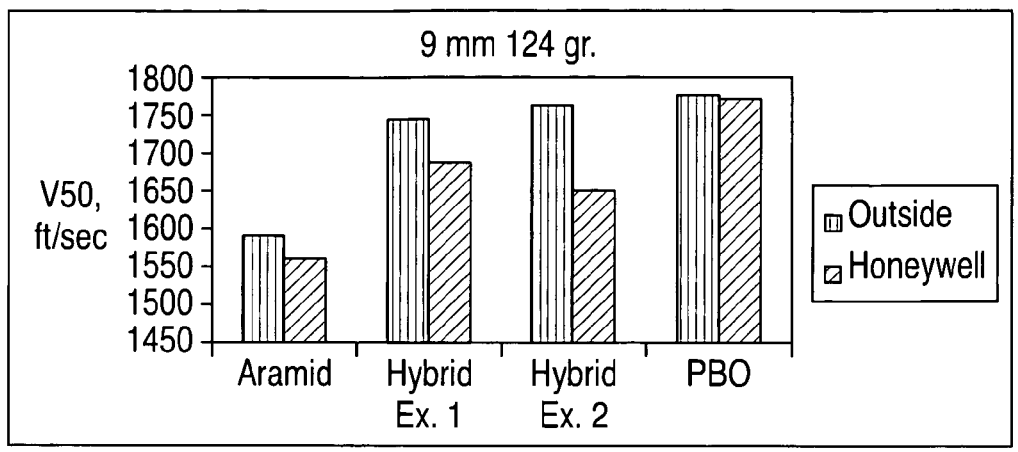
FIG. 4 is a bar chart showing the V50 ballistic test results for Comparative Examples 1 and 2, and Examples 1 and 2 of the invention.
Figure 4B:
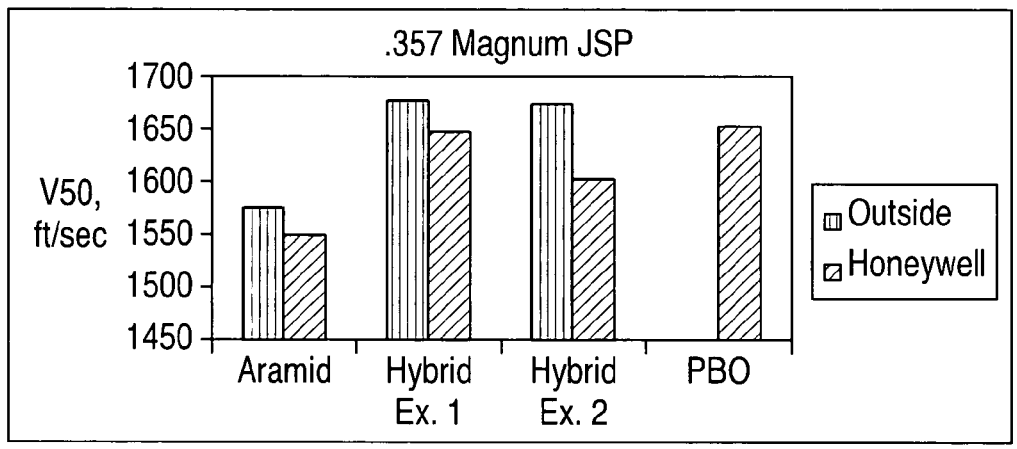
Figure 4C:
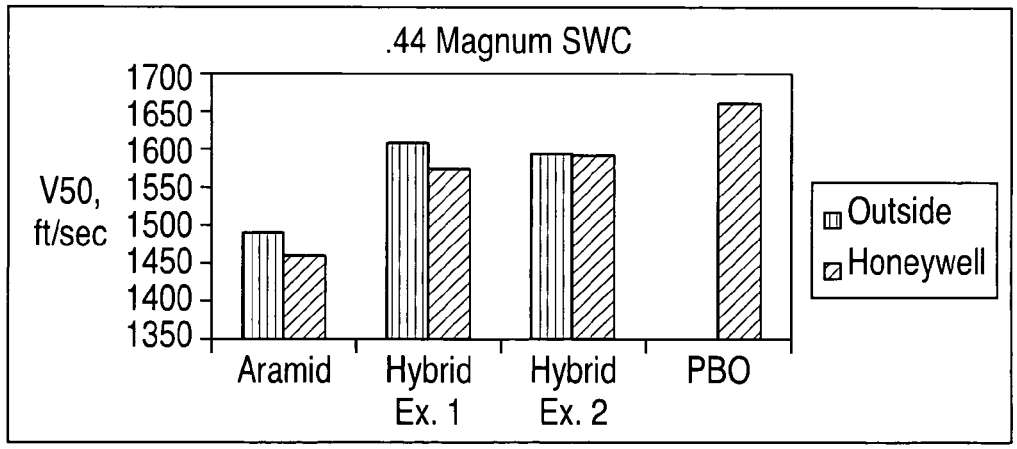
Figure 5A:
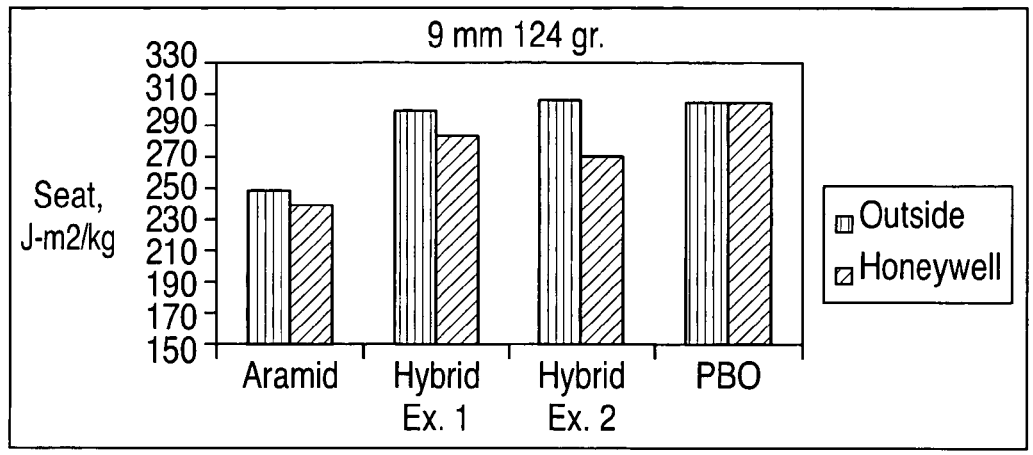
FIG. 5 is a bar chart showing the Specific Energy Absorption (SEAT) test results for Comparative Examples 1 and 2, and Examples 1 and 2 of the invention.
Figure 5B:
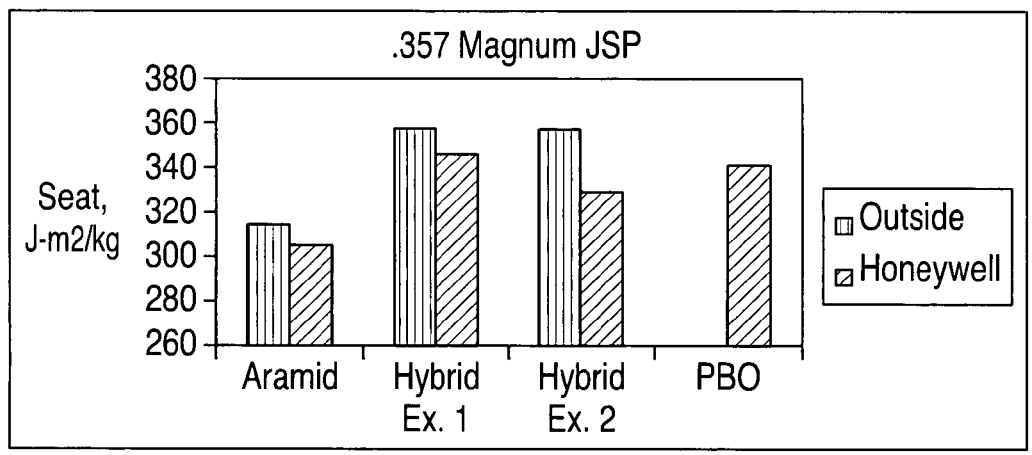
Figure 5C:
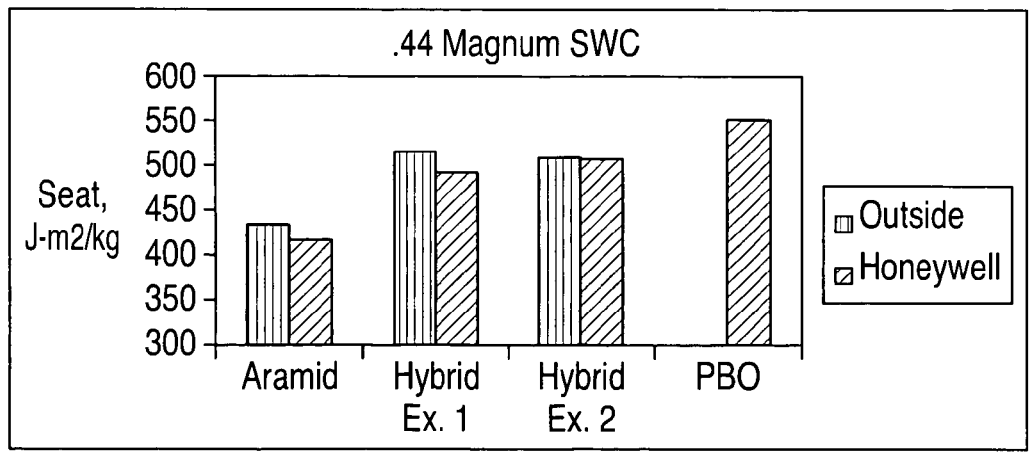

Ballistic tests of the articles described above in Comparative Examples 1 and 2 and in Examples 1 and 2 were performed with the following projectiles: 9 mm, 124 grain bullets, .357 Magnum JSP, 159 grain bullets, and .44 Magnum SWC, 240 grain bullets. Tests were conducted both at Honeywell International and at another laboratory for most projectiles. Both sets of results are shown in Table I below and in FIGS. 4 and 5. The a real densities of the articles, the V50 velocities and the Specific Energy Absorption of the article (SEAT) are tabulated. The V50 velocity is that velocity for which the projectile has a 50% probability of penetration. The SEAT measures the energy absorption of the article per unit a real density. The higher the SEAT, the lighter an armor need be to protect against a given threat. In FIGS. 4 and 5, the data labeled "Aramid" refer to the article of Comparative Example 1. The data labeled "PBO" refer to the article of Comparative Example 2.

It will be seen that the PBO laminates of Comparative Example 2 generally had the highest V50 values and the highest SEAT values. The aramid laminates of Comparative Example 1 had the lowest V50 and SEAT values. The hybrid laminates of the invention having essentially equal weight fractions of each fiber showed V50 and SEAT values that were between the two, but that were closer to those of the PBO laminates.

It might have been anticipated that the hybrid laminates of the invention would show ballistic performance not much different than the least ballistically resistant fiber in the laminate. However, the data of Table I and/or FIGS. 4 and 5 show that the hybrid articles of the invention showed V50 velocities and SEATs that in most cases were at least as great as the weight average ballistic-resistance of the constituent fibers, and in several cases exceeded this average.

It should be noted that the current (September 2003) ratio of the prices for PBO fiber and aramid fiber is 1.78/1. PBO fiber also has the lesser production capacity of the two. Thus, the hybrid laminates of the invention provide a more efficient means of utilizing the more costly and less available fiber.

The hybrid articles of the invention prepared in Examples 1 and 2 met all requirements of NIJ Standard 0101.04 Revision A, for Type IIA body armor including backface signature (not shown in Table 1). It is believed that these articles also met all requirements of NIJ Standard 0115.00 for Type 1 stab protection.

TABLE 1

| | Comparative Example 1 Aramid laminate | | Example 1 Hybrid Aramid/PBO Laminate | | Example 2 Hybrid Aramid/PBO laminate | | Comparative Example 2 PBO laminate | |
|---|---|---|---|---|---|---|---|---|
| Target Areal Density, lb/ft² | 0.767 | | 0.754 | | 0.756 | | 0.771 | |
| | Test Lab | | Test Lab | | Test Lab | | Test Lab | |
| | Honeywell | Other Lab | Honeywell | Other Lab | Honeywell | Other Lab | Honeywell | Other Lab |
| 9 mm, 124 gr | | | | | | | | |
| V50, ft/sec | 1560 | 1590 | 1688 | 1745 | 1650 | 1764 | 1775 | 1776 |
| SEA, J-m²/Kg | 242 | 252 | 289 | 308 | 275 | 314 | 312 | 313 |
| .357 Mag. JSP | | | | | | | | |
| V50, ft/sec | 1545 | 1571 | 1642 | 1668 | 1598 | 1668 | 1649 | — |
| SEA, J-m²/Kg | 305 | 315 | 350 | 361 | 331 | 360 | 345 | — |
| .44 Mag. SWC | | | | | | | | |
| V50, ft/sec | 1467 | 1498 | 1584 | 1625 | 1611 | 1610 | 1681 | — |
| SEA, J-m²/Kg | 420 | 437 | 489 | 515 | 506 | 505 | 551 | — |

Examples 3-17

Hybrid laminates of the invention are prepared according the procedures of Example 1 having the compositions and constructions shown in Table II. The laminates are comprised of pairs of laminae comprising unidirectional fibers in a matrix, the fiber composition of a first lamina of a given pair being the same as the fiber composition of the second lamina of the given pair, the direction of fibers in a lamina being normal to the direction of fibers in an adjacent lamina, and the laminae being bonded together in stacked array. The laminates are balanced and symmetrical.

It is believed that articles consisting of assemblies of the laminates of Table II will have ballistic-resistance (V50 and SEAT) at least as great as the weight average properties of their constituents and will meet the requirements of NIJ Standard 0101.04 Revision A, for Type IIA body armor and/or NIJ Standard 0115.00 for Type 1 stab protection.

TABLE II

| Example | First Fiber | Second Fiber | Third Fiber | Wt. % of Laminate First Fiber | Wt. % of Laminate Second Fiber | Wt. % of Laminate Third Fiber | Pairs of Laminae Comprised of First Fiber | Pairs of Laminae Comprised of Second Fiber | Pairs of Laminae Comprised of Third Fiber | Matrix Material | Matrix Wt. % of Laminate | Plastic Sheet Material | Plastic Sheet Wt. % of Laminate |
|---|---|---|---|---|---|---|---|---|---|---|---|---|---|
| 3 | HMW PE | aramid | none | 41 | 41 | 0 | 1 | 1 | 0 | elastomer | 12 | PE | 6 |
| 4 | HMW PE | PBO | none | 41 | 41 | 0 | 1 | 1 | 0 | elastomer | 12 | PE | 6 |
| 5 | HMW PE | aramid | none | 41 | 41 | 0 | 5 | 5 | 0 | elastomer | 12 | PE | 6 |
| 6 | HMW PE | PBO | none | 41 | 41 | 0 | 5 | 5 | 0 | elastomer | 12 | PE | 6 |
| 7 | HMW PE | aramid | none | 41 | 41 | 0 | 1 | 1 | 0 | vinyl ester | 12 | PE | 6 |
| 8 | HMW PE | PBO | none | 41 | 41 | 0 | 1 | 1 | 0 | vinyl ester | 12 | PE | 6 |
| 9 | Aramid | PBO | none | 34 | 34 | 0 | 2 | 2 | 0 | elastomer | 12 | PC* | 20 |
| 10 | HMW PE | aramid | ceramic | 29 | 29 | 10 | 1 | 1 | 1 | vinyl ester | 12 | PC | 20 |
| 11 | HMW PE | PBO | ceramic | 29 | 29 | 10 | 1 | 1 | 1 | vinyl ester | 12 | PC | 20 |
| 12 | HMW PE | PBO | ceramic | 29 | 29 | 10 | 1 | 1 | 1 | vinyl ester | 12 | PC | 20 |
| 13 | HMW PE | PBO | nylon 6 | 29 | 29 | 10 | 1 | 1 | 1 | elastomer | 12 | PC | 20 |
| 14 | HMW PE | aramid | nylon 6 | 29 | 29 | 10 | 1 | 1 | 1 | elastomer | 12 | PC | 20 |
| 15 | HMW PE | PBO | PET** | 29 | 29 | 10 | 1 | 1 | 1 | elastomer | 12 | PC | 20 |
| 16 | HMW PE | aramid | PET | 29 | 29 | 10 | 1 | 1 | 1 | elastomer | 12 | PC | 20 |
| 17 | Aramid | PBO | ceramic | 37 | 37 | 10 | 1 | 1 | 1 | vinyl ester | 12 | PE | 4 |

*PC = polycarbonate
**PET = poly(ethylene terephthalate)

Examples 18-32

Hybrid laminates of the invention are prepared according the procedures of Example 2 having the compositions and constructions shown in Table III. The laminates are comprised of two or more laminae of unidirectional fibers in a matrix, each lamina being comprised of two or more fibers of different composition in essentially periodic array in a direction transverse to the fiber direction, the directions of the fibers in one lamina being normal to the direction of the fibers in an adjacent lamina, and the laminae being bonded together in stacked array. The laminates are balanced and symmetrical.

It is believed that articles consisting of assemblies of the laminates of Table III will have ballistic-resistance (V50 and SEAT) at least as great as the weight average properties of their constituents and will meet the requirements of NIJ Standard 0101.04 Revision A, for Type IIA body armor and/or NIJ Standard 0115.00 for Type 1 stab protection.

Having thus described the invention in rather full detail, it will be understood that such detail need not be strictly adhered to but that further changes and modifications may suggest themselves to one skilled in the art, all falling with the scope of the invention as defined by the subjoined claims.

TABLE III

| Example | First Fiber | Second Fiber | Third Fiber | Wt. % of Laminate First Fiber | Wt. % of Laminate Second Fiber | Wt. % of Laminate Third Fiber | No. of Laminae | Matrix Material | Matrix Wt. % of Laminate | Plastic Sheet Material | Plastic Sheet Wt. % of Laminate |
|---|---|---|---|---|---|---|---|---|---|---|---|
| 18 | HMWPE | Aramid | none | 41 | 41 | 0 | 2 | Elastomer | 12 | PE | 6 |
| 19 | HMWPE | PBO | none | 41 | 41 | 0 | 2 | Elastomer | 12 | PE | 6 |
| 20 | HMWPE | Aramid | none | 41 | 41 | 0 | 20 | Elastomer | 12 | PE | 6 |
| 21 | HMWPE | PBO | none | 41 | 41 | 0 | 20 | Elastomer | 12 | PE | 6 |
| 22 | HMWPE | Aramid | none | 41 | 41 | 0 | 2 | vinyl ester | 12 | PE | 6 |
| 23 | HMWPE | PBO | none | 41 | 41 | 0 | 2 | vinyl ester | 12 | PE | 6 |
| 24 | Aramid | PBO | none | 34 | 34 | 0 | 4 | Elastomer | 12 | PC* | 20 |
| 25 | HMWPE | Aramid | ceramic | 29 | 29 | 10 | 2 | vinyl ester | 12 | PC | 20 |
| 26 | HMWPE | PBO | ceramic | 29 | 29 | 10 | 2 | vinyl ester | 12 | PC | 20 |
| 27 | HMWPE | PBO | ceramic | 29 | 29 | 10 | 2 | vinyl ester | 12 | PC | 20 |
| 28 | HMWPE | PBO | nylon 6 | 29 | 29 | 10 | 2 | Elastomer | 12 | PC | 20 |
| 29 | HMWPE | aramid | nylon 6 | 29 | 29 | 10 | 2 | elastomer | 12 | PC | 20 |
| 30 | HMWPE | PBO | PET** | 29 | 29 | 10 | 2 | elastomer | 12 | PC | 20 |
| 31 | HMWPE | aramid | PET | 29 | 29 | 10 | 2 | elastomer | 12 | PC | 20 |
| 32 | Aramid | PBO | ceramic | 37 | 37 | 10 | 2 | vinyl ester | 12 | PE | 4 |

*PC = polycarbonate
**PET = poly(ethylene terephthalate)

What is claimed is:

1. A ballistic laminate comprising:
a first non-woven layer comprising a plurality of two or more types of unidirectional fibers of different composition in a matrix, said fibers extending in a first fiber direction, said fibers of said first layer being arranged in a side by side relationship, said side by side relationship extending in a second direction which is transverse to said first fiber direction, said fibers of said first layer being selected from the group consisting of high molecular weight polyethylene, aramid, PBO, PBT, polyamide, polyester, and ceramic fibers, said fibers of different composition extending in an essentially periodic array in said second direction, the periodic distance between fibers of the same composition being from about the diameter of a single fiber to not greater than about 9 millimeters;

a second non-woven layer comprising a plurality of two or more types of unidirectional fibers of different composition in a matrix, said fibers of said second layer extending in a second fiber direction, said fibers of said second layer being arranged in a side by side relationship, said side by side relationship extending in a second direction which is transverse to said second fiber direction, said fibers of said second layer being selected from the group consisting of high molecular weight polyethylene, aramid, PBO, PBT, polyamide, polyester, and ceramic fibers, said fibers of different composition extending in an essentially periodic array in said second direction, the periodic distance between fibers of the same composition being from about the diameter of a single fiber to not greater than about 9 millimeters said second fiber direction being at an angle relative to said first fiber direction;

said first and second layers being bonded together in a stacked array.

2. The laminate of claim 1 wherein the periodic distance between fibers of the same composition in each of said first and second layers is not greater than about 5 millimeters.

3. The laminate of claim 1 wherein said fibers of each of said first and second layers are selected from the group consisting of high molecular weight polyethylene, poly(p-phenylene terephthalamide), copolymers of p-phenylene terephthalamide, poly(p-phenylene-2-6-benzobisoxazole), and poly(p-phenylene-2-6-benzobisthiazole).

4. The laminate of claim 1 wherein said fibers of each of said first and second layers are selected from the group consisting of high molecular weight polyethylene, aramid, and PBO.

5. The laminate of claim 1 wherein said fibers of each of said first and second layers comprise aramid and PBO fibers.

6. The laminate of claim 1 wherein said fibers of each of said first and second layers comprise high molecular weight polyethylene and aramid fibers.

7. A ballistic laminate comprising:

a first non-woven layer comprising a plurality of two or more types of unidirectional fibers of different composition in a matrix, said fibers of said first layer extending in a first fiber direction, said fibers of said first layer being arranged in a side by side relationship, said side by side relationship extending in a second direction which is transverse to said first fiber direction, said fibers of different composition extending in an essentially periodic array in said second direction, said fibers of said first layer being selected from the group consisting of high molecular weight polyethylene, aramid, PBO, PBT, polyamide, polyester, and ceramic fibers, the periodic distance between fibers of the same composition being from about the diameter of a single fibre to not greater than about 9 millimeters, said first layer having inner and outer surfaces;

a second non-woven layer comprising a plurality of two or more types of unidirectional fibers of different composition in a matrix, said fibers of said second layer extending in a second fiber direction, said fibers of said second layer being arranged in a side by side relationship, said side by side relationship extending in a second direction which is transverse to said second fiber direction, said fibers of different composition extending in an essentially periodic array in said second direction, said fibers of said second layer being selected from the group consisting of high molecular weight polyethylene, aramid, PBO, PBT, polyamide, polyester, and ceramic fibers, the periodic distance between fibers of the same composition being from about the diameter of a single fibre to not greater than about 9 millimeters; said second fiber direction being at an angle relative to said first fiber direction, said second layer having inner and outer surfaces;

said first and second layers being bonded together in a stacked array with said inner surface of said first layer being bonded to said outer layer of said second layer; and at least one plastic sheet attached to at least one of said outer surface of said first layer or said inner surface of said second layer.

8. The laminate of claim 7 wherein said fibers of each of said first and second layers are selected from the group consisting of high molecular weight polyethylene, aramid, and PBO.

9. A ballistic laminate consisting essentially of two or more non-woven laminate of unidirectional fibers in a matrix; the lamina of said laminae being comprised of two or more fibers of different composition, said fibers being selected from the group consisting of high molecular weight polyethylene, aramid, PBO, PBT, polyamide, polyester, and ceramic fibers; said fibers of each lamina extending in a fiber direction and being arranged in a side by side relationship, said fibers of different composition in each lamina extending in an essentially periodic array in a direction transverse to said fiber direction of said lamina;

the periodic distance between fibers of the same composition being from about the diameter of a single fibre to not greater than about 9 millimeters;

the direction of said fibers in one lamina of a laminae being at an angle relative to the direction of said fibers in an adjacent lamina of said laminae; and adjacent laminae being bonded together in a stacked array.

10. The laminate of claim 9 consisting essentially of at least one pair of said laminae, wherein the direction of the fibers in one laminae is normal to the direction of fibers in an adjacent laminae.

11. The laminate of claim 10 wherein the composition and construction of at least one adjacent pair of said laminae is the same.

12. The laminate of claim 11 wherein the periodic distance between fibers of the same composition being from about 0.02 millimeters to not greater than about 5 millimeters.

13. The laminate of claim 12 wherein said fibers are selected from the group consisting of high molecular weight polyethylene, aramid, and PBO.

14. The laminate of claim 13 wherein adjacent fibers in said side by side relationship are of a different composition.

* * * * *